(12) United States Patent
Irwin, Jr. et al.

(10) Patent No.: US 8,199,370 B2
(45) Date of Patent: Jun. 12, 2012

(54) ENHANCED SCANNER DESIGN

(75) Inventors: Kenneth E. Irwin, Jr., Alpharetta, GA (US); Sten Mejenborg, Cumming, GA (US); Jonathan Holbrook, Cumming, GA (US); Burbank Herndon, Alpharetta, GA (US); William F. Behm, Roswell, GA (US); Gary R. Streeter, Andover, MA (US)

(73) Assignee: Scientific Games International, Inc., Newark, DE (US)

( * ) Notice: Subject to any disclaimer, the term of this patent is extended or adjusted under 35 U.S.C. 154(b) by 958 days.

(21) Appl. No.: 12/200,367

(22) Filed: Aug. 28, 2008

(65) Prior Publication Data
US 2009/0059316 A1    Mar. 5, 2009

Related U.S. Application Data

(60) Provisional application No. 60/966,582, filed on Aug. 29, 2007.

(51) Int. Cl.
*H04N 1/04* (2006.01)
(52) U.S. Cl. ........................................ 358/474; 358/498
(58) Field of Classification Search .................. 358/474, 358/498; 347/263, 257; 348/195, 196, 207.1; 359/17
See application file for complete search history.

(56) References Cited

U.S. PATENT DOCUMENTS

| | | | |
|---|---|---|---|
| 5,101,447 A | 3/1992 | Sokoloff et al. | |
| 5,109,153 A | 4/1992 | Johnsen | |
| 5,619,254 A * | 4/1997 | McNelley | 348/14.16 |
| 6,419,157 B1 | 7/2002 | Ehrhart et al. | |
| 6,439,743 B1 * | 8/2002 | Hutchison | 362/244 |
| 7,248,280 B2 * | 7/2007 | Cannon et al. | 347/263 |
| 7,640,691 B2 * | 1/2010 | Karcher et al. | 42/118 |
| 2003/0048488 A1 | 3/2003 | Satou | |
| 2009/0114280 A1 * | 5/2009 | Jensen et al. | 136/259 |

FOREIGN PATENT DOCUMENTS

| | | |
|---|---|---|
| EP | 1 233 606 A | 8/2002 |
| GB | 2 405 045 A | 2/2005 |

OTHER PUBLICATIONS

PCT International Search Report for PCT/US2008/074761, Dated Nov. 11, 2008.

* cited by examiner

*Primary Examiner* — Jerome Grant, II
(74) *Attorney, Agent, or Firm* — Dority & Manning, P.A.

(57) ABSTRACT

Improved scanner designs are provided to improve imaging and reduce errors during the scanning process. Embodiments disclosed include, for example, the use of dual cameras to improve imagery and reduce the scanner enclosure size, synchronized lighting techniques during the scanning sequence, shielded lens for the camera scanner, a scanner enclosed on at least three sides, adjustments to scanner lighting based on the levels of ambient lighting, a combined branding and scanner apparatus, a gimbaled scanner mount, and a tilted platen with stop for document alignment.

12 Claims, 18 Drawing Sheets

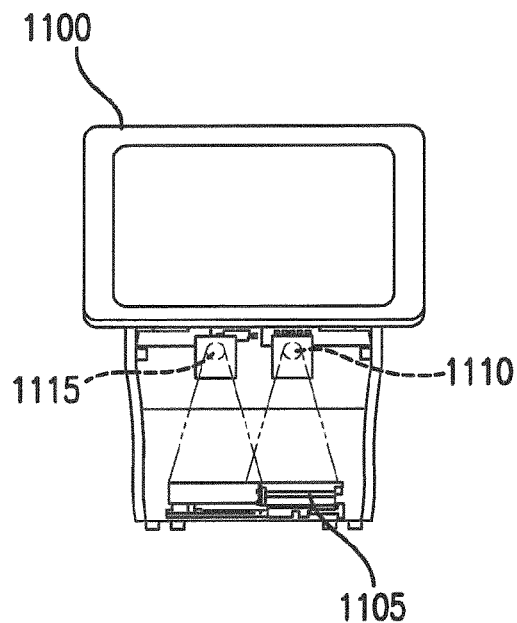
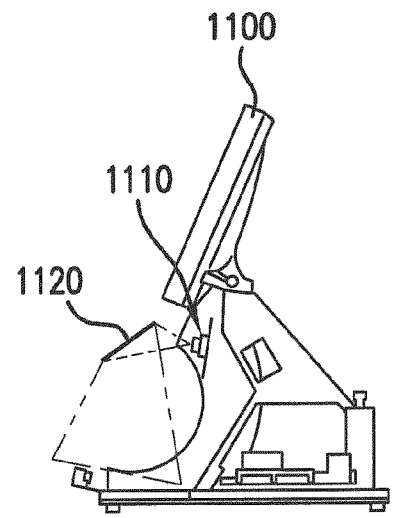
FIG.11A  FIG.11B
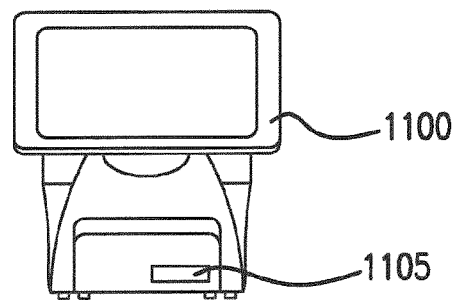
FIG.11C

ENHANCED SCANNER DESIGN

PRIORITY CLAIM

The present application claims priority to U.S. Provisional Application Ser. No. 60/966,582, filed Aug. 29, 2007.

BACKGROUND OF THE INVENTION

An Embedded Optical Signature (EOS) can be added to a lottery scratch-off ticket as, for example, an image under the scratch-off coating. The EOS validation data revealed from under the removed scratch-off coating can then be processed with the ticket's barcode data (not hidden under a scratch-off coating) allowing the ticket to be validated without any other action required from the person initiating the transaction. An EOS can also be used to ensure the authenticity of a printed document, such as an on-line lottery ticket, provide copyright protection, or carry additional information such as the name and address of an individual filling out a form.

To process an EOS from a document (e.g., scratch-off lottery ticket, on-line lottery ticket, receipt, bet slip, etc.), a scanner or camera is generally necessary to capture a digital image of the document. An inexpensive camera, linear sensor, or contact image sensor may be used to provide this image capture functionality. However, certain problems may be encountered in such applications.

For example, whether attempting to capture an EOS or other information on a printed document, a scanner should preferably be able to capture the relevant data without interference from the surrounding environment. Linear or Contact Image Sensors (CIS) typically include a mechanical mechanism that either moves the document past the sensor or vice versa. One method of isolating the scan head from environmental light contamination is to provide intrinsic illumination in a darkened environment. However, with this type of system, traces of dirt or debris on the scan head can create a significant amount of image noise because the scan head only captures one dimension of the image with the movement of the document/scan head providing the other dimension. FIG. 1 illustrates this problem with scan 100 being of a blank document with small particles of dirt on the scan head and scan 105 showing the same document with a clean scan head. This susceptibility to dirt-induced noise makes this type of scanner disfavored for dirty environments such as, for example, the processing of scratch-off lottery tickets. Additionally, if a questionnaire or bet slip is completed with a ballpoint pen and a sufficient amount of time is not allowed for the ink to completely dry, ink can transfer to the scan head and create this type of dirt-induced noise in linear/CIS scanners. Additionally, the reliability of a mechanical scanning mechanism is inherently worse than a fully electronic device.

Two-dimensional camera scanners can minimize the effects of dirt and ink noise while increasing reliability by eliminating the need to physically move the document or scan head. Additionally, mounting the camera some distance away from the target document creates an open space that isolates the camera lens from the dirt/ink noise sources. If the camera is placed above a platen, the dirt and ink noise problem can be further reduced because a fresh document is presented for each scan with no visible residual dirt left on a scanning surface or glass platen if the document is scanned face up. Unfortunately, the spacing of the camera above a platen allows direct-reflection-noise (i.e., glare) to be introduced from ambient light or poorly positioned scanner lighting sources. Referring to FIG. 2, image 200 shows a scratch-off lottery ticket with ambient glare while image 205 shows a scratch-off lottery ticket without ambient glare. Image 210 shows a camera image of a scratch-off lottery ticket with glare from internal lighting while image 215 shows the same lottery ticket without glare from internal lighting.

Glare noise from ambient light sources can be eliminated by encasing the camera scanner mechanism in a light tight enclosure. However, opening a door or moving a curtain may be cumbersome and slow for an operator. Careful placement of light sources can also eliminate scanner-internal glare noise. As illustrated in FIG. 3A, glare is eliminated or reduced as light sources 300 are moved into non-reflection areas 305. FIG. 3B shows a camera view of a platen 320 with a light source about 2 inches above on both sides while platen 325 has a light source and diffuser about 2 inches above on both sides such that less glare is apparent on the platen. FIG. 4 illustrates the light intensity relative to the x-y location on a platen with various locations for the light sources. For example, graph 400 represents a platen with side illumination sources 1 inch above the platen, graph 405 represents a platen with side illumination sources 2 inches above the platen, graph 410 represents a platen with side illumination sources 4 inches above the platen, and graph 415 represents a platen with side illumination sources 5 inches above the platen As illustrated in FIGS. 3A, 3B and 4, moving the light sources further away from the platen greatly improves the side to side illumination uniformity and substantially improves front to rear illumination uniformity, but requires significantly more space for the scanner housing. Additionally, mounting a camera above a platen and not securing the document to a flat plane introduces a potential new error source if the document is bowed. More specifically, variability in the distance between the scanned surface and the camera can introduce a locational error that limits the size of symbols.

Trapezoidal error is introduced if the camera is not mounted perfectly parallel to the plane of the platen. If a mirror is added in an attempt to reduce the size of the scanner housing, proper alignment becomes even more critical because any alignment error will be magnified by a factor of two.

Finally, a camera and platen based scanning system is susceptible to errors caused by the human operator improperly aligning the document on the platen. This problem is less of an issue with motorized one-dimensional scanners (e.g., CIS) since the motor can be used to help align the document.

Therefore, while two-dimensional camera scanning can virtually eliminate dirt and ink induced noise and increase the reliability of the scanner (i.e., no moving parts), such a design can introduce its own sources of scanning errors, which can become increasingly irksome as the target document grows in size. New scanner designs capable of processing large documents (for example, questionnaires, large instant tickets with EOS, or bet slips with smaller decision grids) would be particularly advantageous. Accordingly, the present disclosure provides alternatives by which the performance of a camera and other image scanning devices may be enhanced and improved.

SUMMARY OF THE INVENTION

Objects and advantages of the invention will be set forth in part in the following description, or may be obvious from the description, or may be learned through practice of the invention.

In one exemplary embodiment, the present invention includes a scanner having a shield surrounding the scanner lens to block ambient or interfering light sources.

In another exemplary embodiment, the present invention includes an enclosure for a scanner that defines an opening to an interior space where the platen is located. The enclosure provides for shielding the platen along at least three sides so as to minimize or eliminate glare or interference from external light sources.

The present invention also includes an exemplary embodiment in which the scanner platen is tilted at a slight downward angle from the opening to the enclosure. The side of the enclosure or a stop-element within the enclosure assists with settling the document into place after insertion. As such, the tilted platen helps to ensure that the document being scanned is properly positioned and/or oriented.

Another exemplary embodiment of the present invention includes a gimbaled mount for the camera scanner. The gimbaled mount allows for the camera to be properly aligned relative to the platen so as to minimize trapezoidal error. A locking mechanism may be provided to secure the position of the camera once aligned. In another embodiment of the invention, the scanner enclosure is constructed within precise tolerances to ensure proper alignment and reduce or eliminate trapezoidal error.

In another exemplary embodiment, a scanner design is provided in which the light source is located below a mirror to reduce the housing height. The mirror is located near the target document so that the horizontal distance between light sources decreases to approximately the target width plus an offset.

The present invention also includes an embodiment in which a scanner's light sources are synchronized with the camera's raster scanning. Multiple light sources are positioned relative to the platen at specific locations such that as the camera scans the documents, the lights are turned on and off in a sequence that illuminates the document while eliminating or minimizing glare or direct reflection. The present invention also includes an improved scanner embodiment in which the brightness of the scanner's internal lighting is increased so as to reduce the scanner's sensitivity to ambient or other external light sources.

In still another exemplary embodiment of the present invention, an improved scanner design includes a monochromatic or near monochromatic light source coupled with a narrow band filter to minimize or eliminate interfering light.

The present invention also includes an exemplary embodiment in which different color light sources (e.g., red, green, blue) are built into the scanner. With this embodiment, when a document is inserted in the scanner for capture, the camera can be programmed to first capture one frame with the scanner's lights extinguished. Therefore, any light readings that are recorded in this frame represent the ambient environmental light noise. The average magnitude of the intensities of all of the camera's red, blue, and green pixels are compared and the color with the lowest average reading is selected for illumination and processing, since it represents the lowest light level of the environmental noise.

In another exemplary embodiment of the present invention, an improved scanner has multiple cameras with overlapping or nearly overlapping fields of view of the same platen. During processing, the overlapping area from the resulting images is either eliminated or combined to achieve a composite image. In still another embodiment of the present invention, multiple cameras are each arranged to view all or most of the entire platen. The resulting image is then evaluated (e.g. using software) to eliminate or reduce one or more of the scanner errors previously described above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 3A is a schematic illustration of the preferred positioning of light sources for a camera scanner while

FIGS. 5 through 13 illustrate various additional exemplary embodiments of the present invention.

DETAILED DESCRIPTION

Reference will now be made in detail to embodiments of the invention, one or more examples of which are illustrated in the figures. Each example is provided by way of explanation of the invention, and not meant as a limitation of the invention. For example, features illustrated or described as part of one embodiment can be used with another embodiment to yield a third embodiment. It is intended that the present invention include these and other modifications and variations.

The present invention includes apparatus and methods for using two-dimensional camera based scanning systems to capture information on documents while minimizing error sources previously described. Different embodiments and methods are discussed that can be used in combination or separately as desired. Additionally, a method of aligning online tickets that permits branding (visibly altering the ticket to indicate that its status has changed—e.g., paid or cancelled) is also disclosed.

Figure 5:
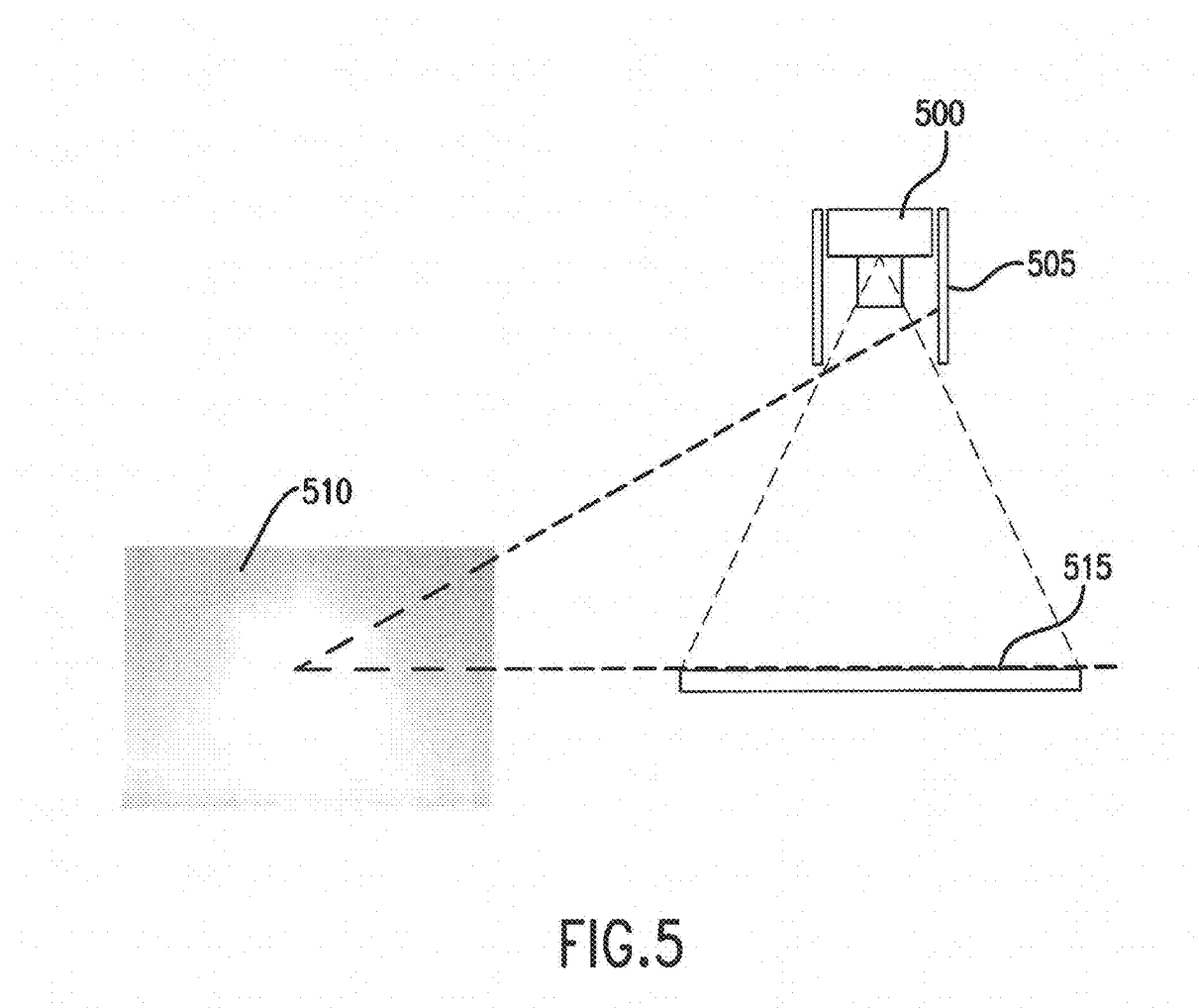

One exemplary technique for protecting a camera-based scanner from environmentally induced noise (e.g., glare) is to partially enclose the scan area and physically alter the platen. Referring to FIG. 5, camera and lens 500 are protected by a shield 505 from ambient light 510 that could cause lens flaring—i.e. bright spots caused by a light source shining directly into the lens. While most retail environments have ceiling mounted light sources that would not interfere with a camera pointed directly down regardless of shielding, low angle light sources can induce lens flaring or glare in some locations. In the case where the low angle light source is either early morning or late afternoon sunlight, the noise source can be misdiagnosed as an intermittent scanner problem. This potential intermittent problem can be avoided by extending an opaque shield 505 below the camera lens 500 such that interfering light sources 510 in line with or above the platen 515 would not be able to directly illuminate the camera lens 500. To be effective, the light shield 505 should preferably encircle the camera lens 360 degrees and have a non-glossy/non-reflective finish to avoid glare from ambient light sources 510 wherever a document is not covering the platen.

Figure 6:
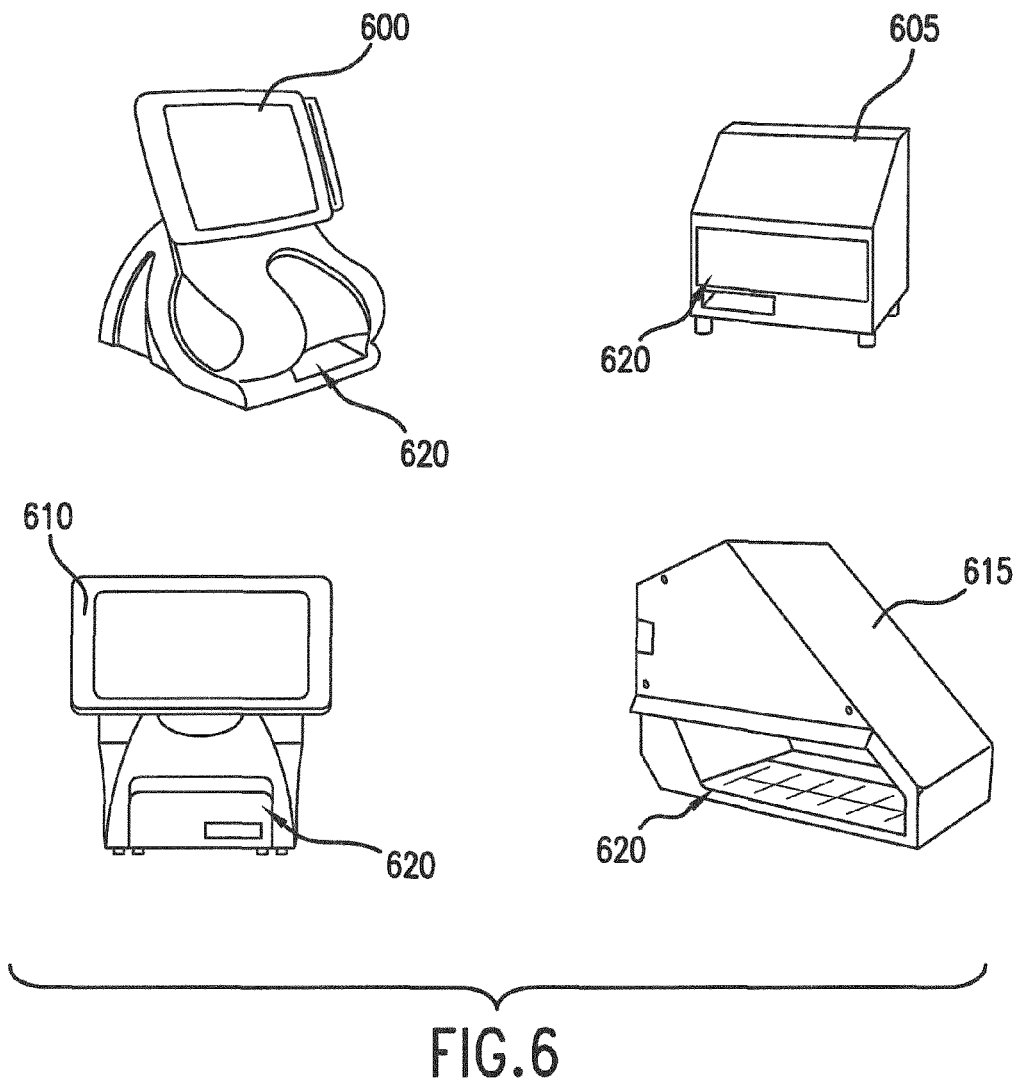

As seen in FIG. 6, this exemplary technique can be extended to enclose the camera and platen on three sides as well as the top and bottom, leaving one side available for human operator access. FIG. 6 includes multiple embodiments of cabinets or enclosures 600, 605, 610, and 615 that each have an opening 620 for operator access. Each enclosure includes a scanner (e.g. a camera-based scanner) but may also include other components such as a display monitor or transaction register. With these shielding configurations 600, 605, 610 and 615, the only side of the camera-based scanner that is exposed to potential ambient light noise is the same side that the human operator would normally be blocking with his or her body, virtually eliminating glare noise from ambient environmental sources. Such three-sided enclosures 600, 605, 610, and 615 also allow for multiple scanner lights that can be placed to provide uniform illumination while at the same time avoiding any direct reflections to the camera. Like the camera shield and platen, the three-sided enclosure's interior should also be a non-glossy/non-reflective finish. By way of example, the three-sided enclosures 600, 605, 610, and 615 create a semi-dark scanning area that enables the camera-based scanner to use various optical techniques to authenticate a document—e.g., illuminate and detect ultraviolet or infrared fluorescence from a taggant present on authentic documents. It should be noted that this type of document authentication would be virtually impossible with a housing design that allows excessive ambient light into the scanning area.

While the camera-based scanner enclosure modifications disclosed above help reduce or eliminate ambient light noise, they do not ensure that the operator properly positions the target document within the camera's field of view. Another technique according to the present invention is to provide a platen that is tilted at a slight angle (e.g., 10 degrees) down from the document input opening. For example, a tilted platen could be provided within opening 620 of enclosures 600, 605, 610, and 615. Such tilted platen will cause the document to slide and settle against a wall or other element of the scanner such that the document is correctly positioned in the camera's field of view (provided the camera must also be physically arranged to be parallel to the tilted platen). As a result, many document insertion errors can be automatically corrected. Additionally, tilting the platen below the opening will also help reduce glare from ambient environmental light sources.

As previously discussed, trapezoidal error can also be introduced if the camera is not mounted parallel to the plane of the platen. For example, assuming an 8.1-inch (206 mm) focal length and 4-inch (102 mm) field of view, trapezoidal error increases by approximately 1.2% on the farthest edge of the platen for every degree that the platen is offset relative to the camera. If a mirror is added, even more chances for an alignment problem are created because the alignment error increases by a factor of two over a camera direct-view design. For example, with a mirror added at a nominal 45° angle between the camera view and the platen, a one degree sum total tilt error (i.e., platen, mirror, and camera combined) causes 2.4% distortion at the far end of the platen. Two degrees of tilt results in 4.8% distortion and so on.

Figure 7A:
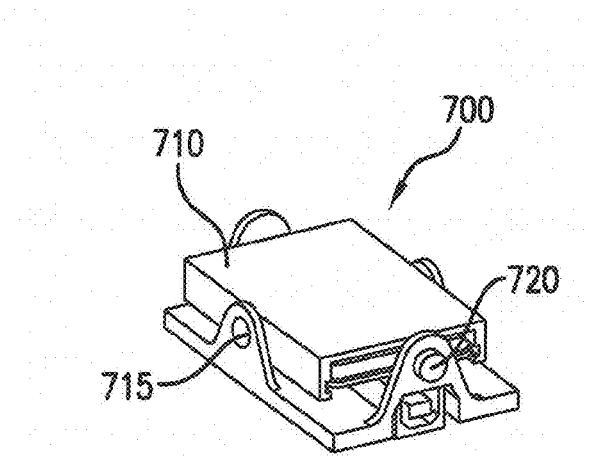
Figure 7B:
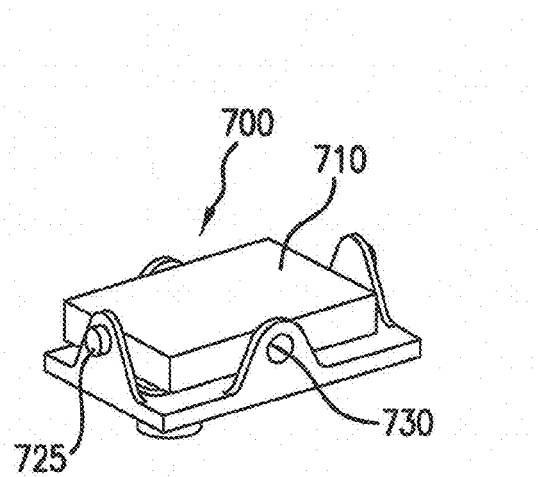

Accordingly, another exemplary technique according to the present invention is to specify very tight tolerances for the enclosure. However, tight tolerances invariably result in a more expensive enclosure. Thus, yet another exemplary technique according to the present invention is to use a gimbaled camera mount that allows the camera to be aligned parallel to the platen at final assembly. FIGS. 7A and 7B provide an exemplary embodiment of a gimbaled camera mount 700. As shown, the mount includes a surface 710 upon which the camera may be mounted. Pivot points 715, 720, 725, and 730 allow the orientation of the camera to be aligned as desired. Once the gimbaled camera mount 700 is aligned, locking screws (not shown) can be used to ensure that the assembly does not move during shipping. Alignment of the gimbal can be readily accomplished during assembly, for example, by using a rectangular target grid and a software program.

Figure 1:
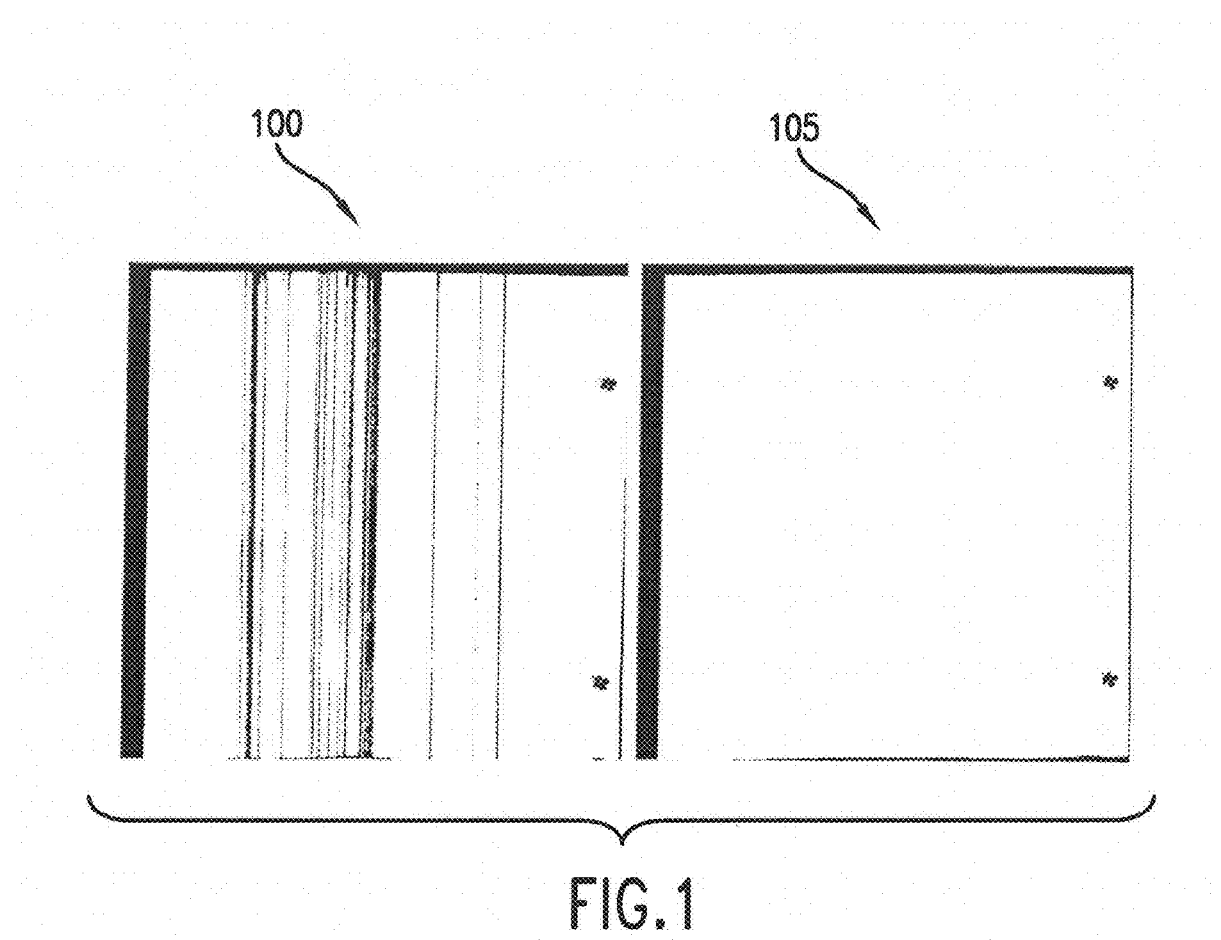
FIG. 1 is a comparison of a document scanned with and without contamination on the scan head.
Figure 2:
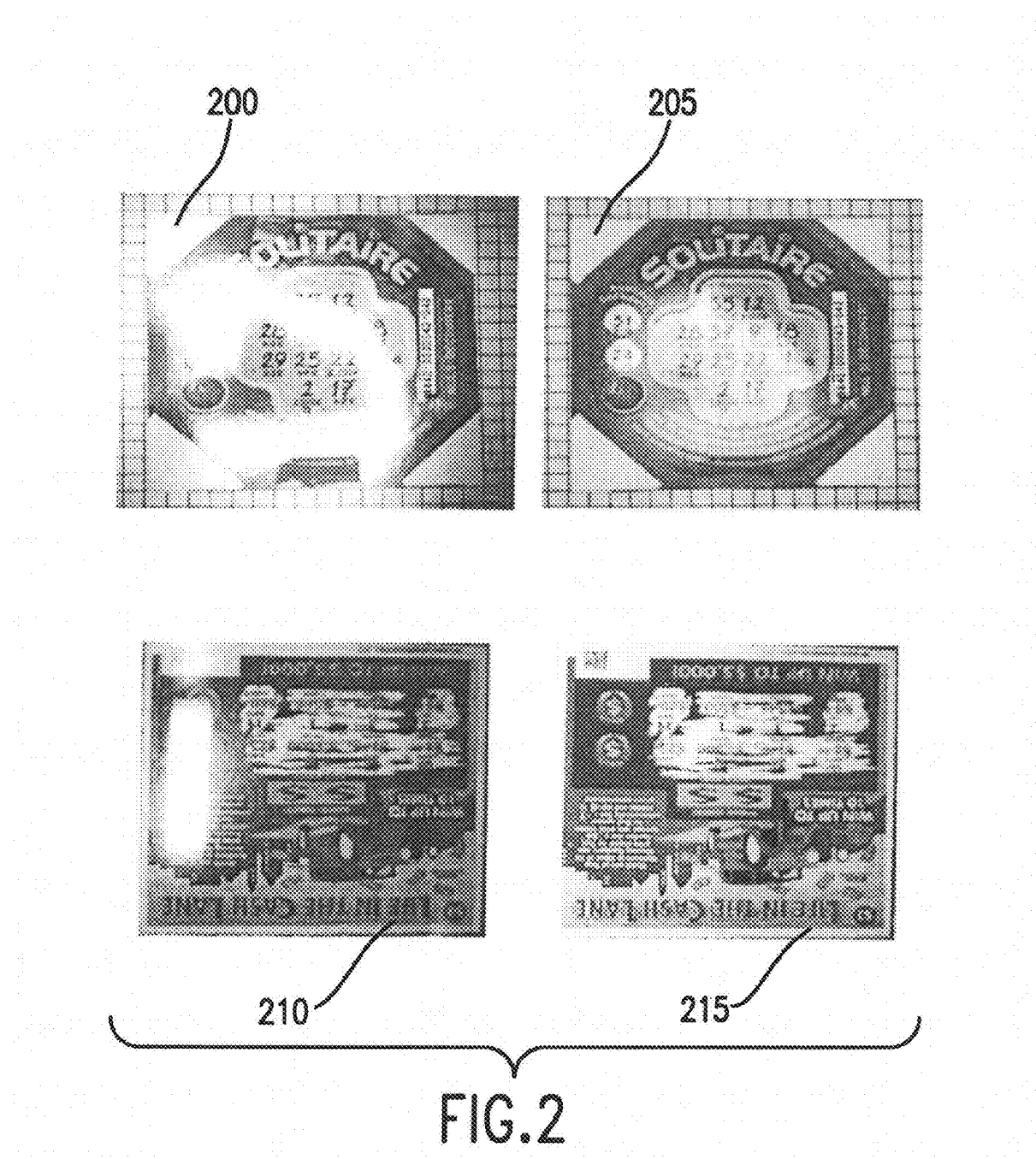
FIG. 2 is a comparison of various scanned images with and without glare from various sources.
Figure 3A:
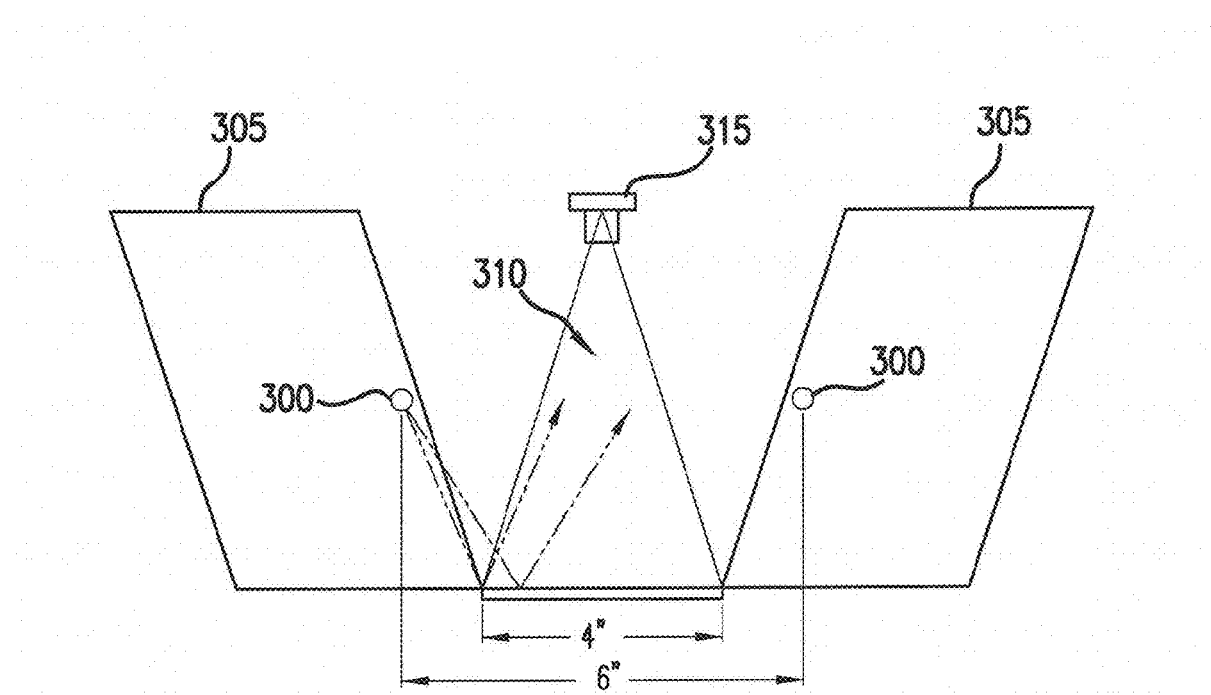
Figure 3B:
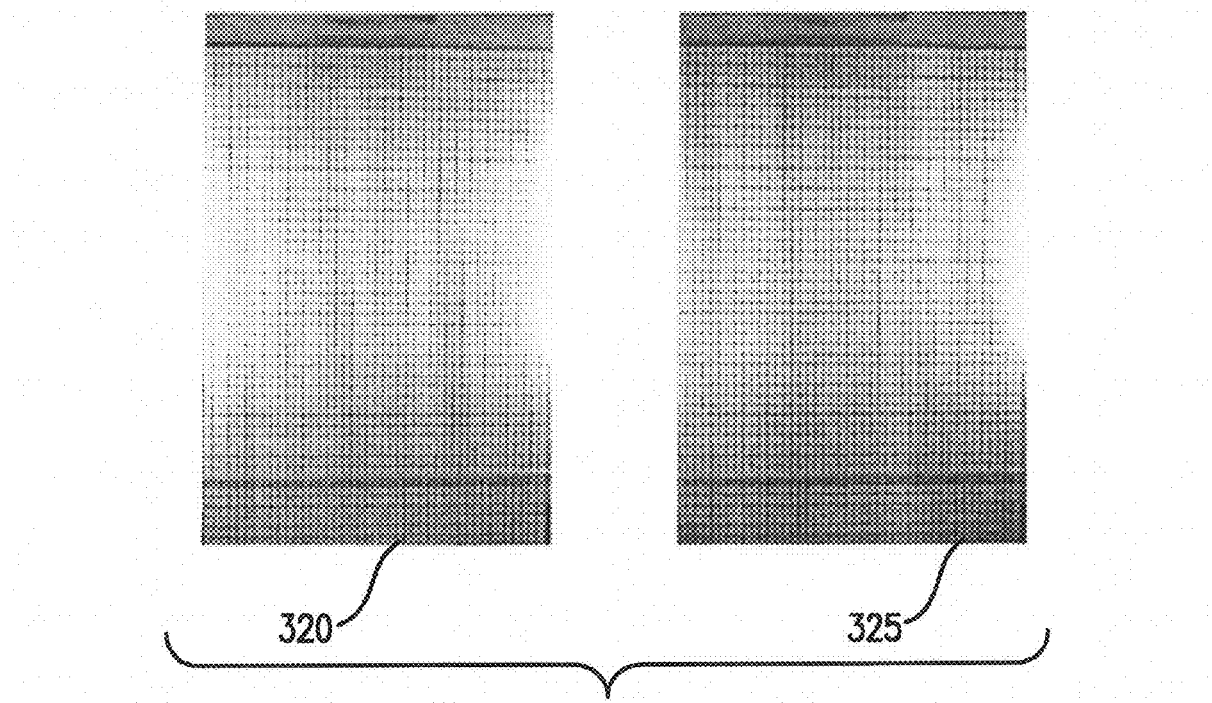
FIG. 3B shows differences in scanning caused by repositioning of light sources.
Figure 4:
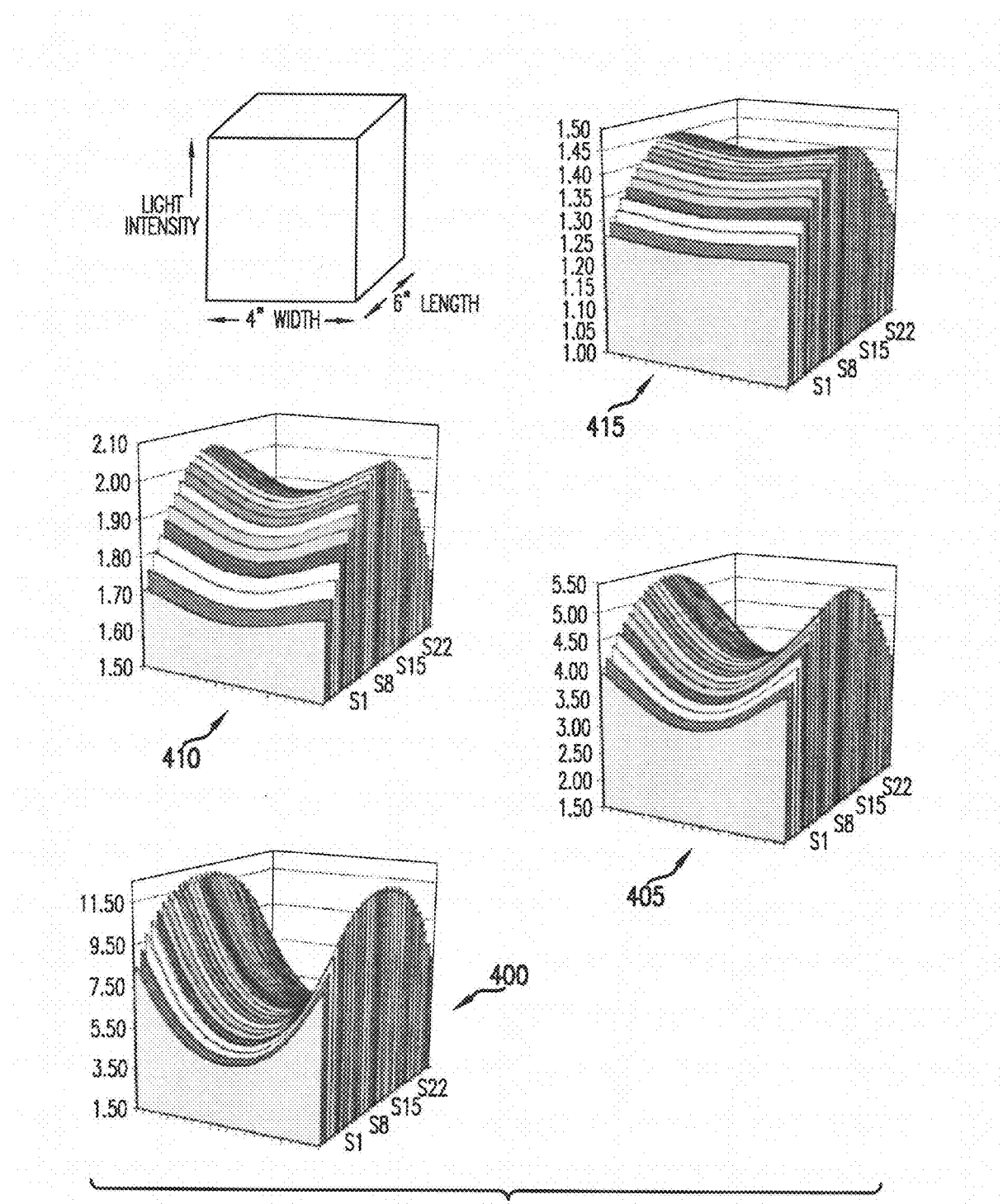
FIG. 4 illustrates differences in light intensity based on the location of a light source relative to the platen.

As previously discussed, proper illumination of the document in a scanner is a difficult problem. If the light source is improperly placed, a direct reflection from the document or platen can blind the camera. Moving the light source to avoid direct reflections increases the physical space required for the scanner enclosure. Under a another exemplary technique according to the present invention, as previously shown in FIG. 3A, glare is eliminated or reduced as light sources 300 are moved into non-reflection areas 305. Document illumination uniformity improves as the distance between the light source and target document increases. If, for example, the light source is located halfway between the camera and target document and two light sources are used to evenly illuminate the document, the width of the scanner housing would be a minimum of 1.5 times the document width. For example, with a 4-inch wide ticket, the housing would be more than 6-inches wide (to accommodate the physical dimensions of the light source and housing thickness) so that none of the light rays from the light source can reflect directly into the camera aperture. The problem may be compounded if a mirror is introduced into the housing to reduce height because the mirror may cast a partial shadow on the target unless the light source is located below the mirror. Accordingly, one advantageous technique includes moving the light closer to the target so that the horizontal distance between light sources decreases to approximately the target width plus an offset. Of course, under-illumination of the center of the document can be disadvantageous because the light must travel further and therefore has less intensity.

Figure 8:
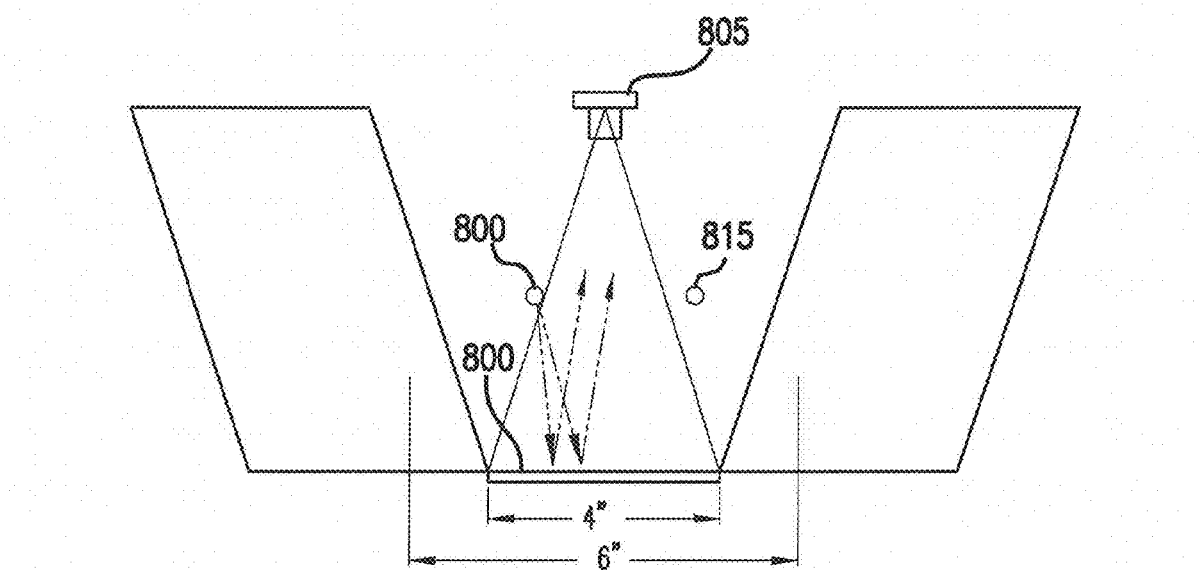

While precision placement of light sources can eliminate direct reflection and minimize uneven illumination of the target document, as previously stated the geometry of the light placement can increase the scanner's size and shape, which may be undesirable in certain situations. Accordingly, another exemplary technique according to the present invention is to synchronize multiple scanner light sources with the camera's raster scanning. With this technique, scanner lighting can be placed where direct reflections would occur on portions of the target. The light source is enabled while the camera scans only those portions of the target that do not cause a direct reflection. As the scan is completed, any offending light sources are extinguished and different light sources are turned on so that the scan can continue with illumination but not direct reflection. Such a design can be used to create a smaller scanner design and, consequently, a smaller enclosure for the camera scanner. Additionally, by synchronizing illumination to raster scanning, more uniform illumination of the document target is possible. For example, referring to FIG. 8, light source 800 may be activated while camera scanner 805 scans a portion of target 810 creating illumination but no direct reflections. Light source 815 is either off or positioned not to cause glare or direct reflections. As camera scanner 805 completes the scan, the scanning is synchronized with the activation of light source 815 and the deactivation of light source 800 (or movement thereof) so as to continue to ensure that only illumination without direct reflection is created.

Figure 9A:
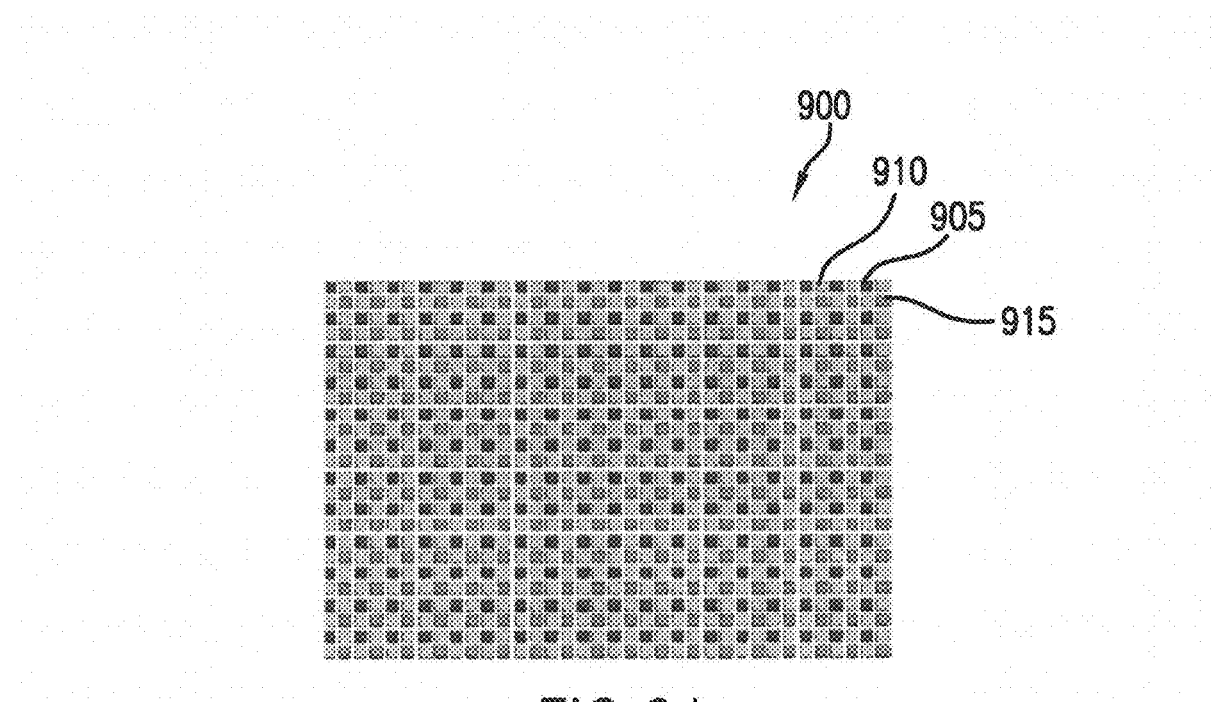

As illustrated schematically in FIG. 9A, synchronizing scan-illumination is possible because a camera's light sensing array 900 is comprised of a two dimensional arrangement of pixels, with each pixel 905, 910, and 915, for example, being sensitive to either red, green, or blue light. A camera captures an image by capturing one row of pixels at a time in a raster scanning process. Thus, at any one moment during the scanning process, only one row of camera pixels is susceptible to direct reflection from the scanner's light source. Therefore, if the scanner's lighting source are turned on and off at the proper speed and timing, only the lights that will not reflect directly into the camera's active scan line are illuminated. Light emitting diodes (LEDs) typically have turn-on/off times of less than 100 ns and are therefore suitable for synchronized illumination with a raster scan camera. However, incandescent lamps, which can have turn on/off times in the order of 500 ms, are generally not suitable.

Figure 9B:
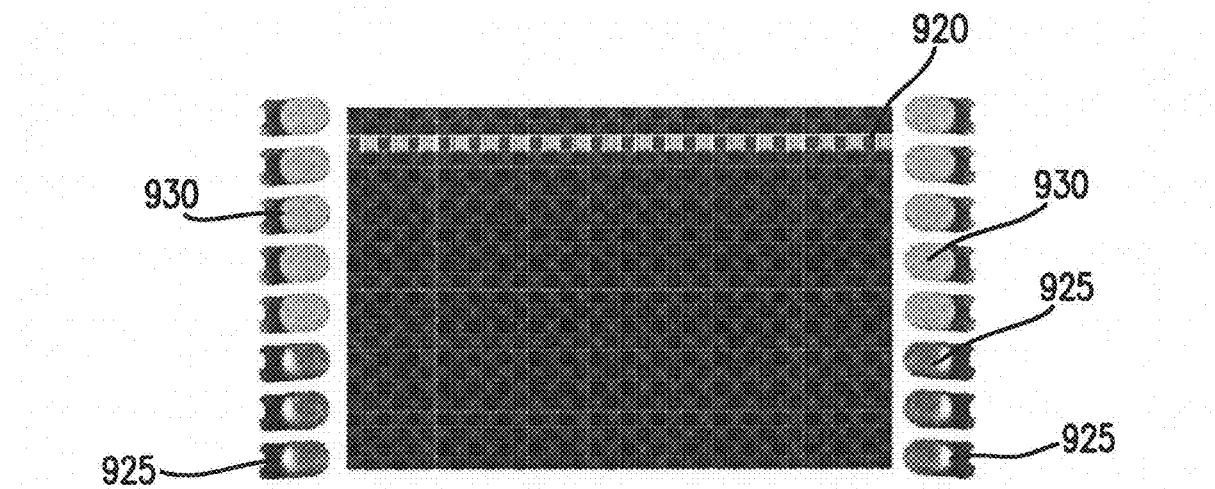
Figure 9C:
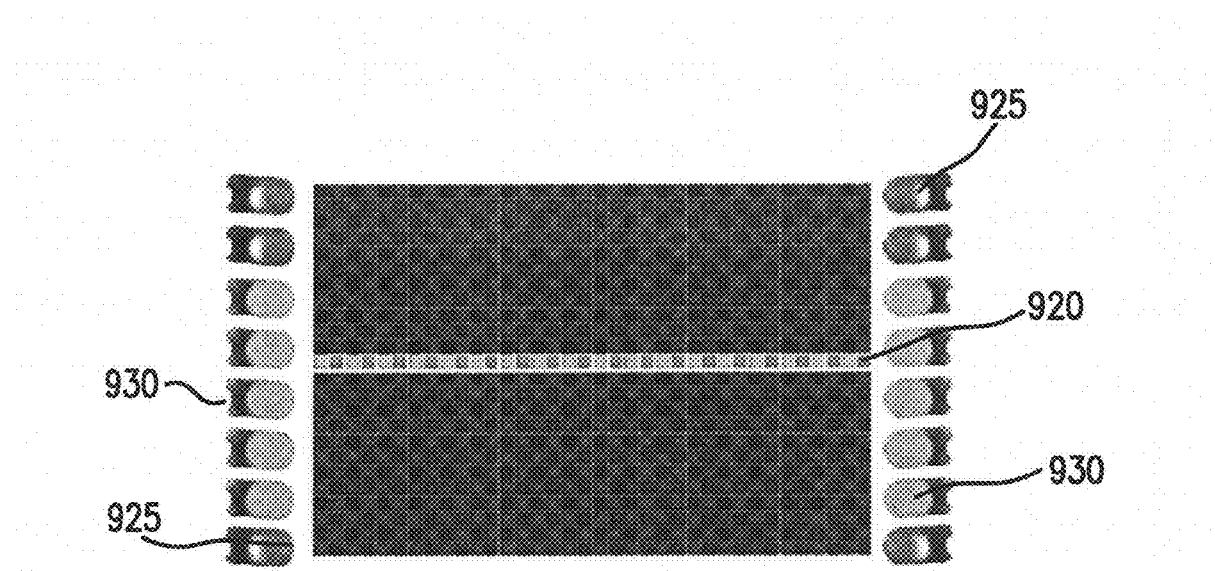
Figure 9D:
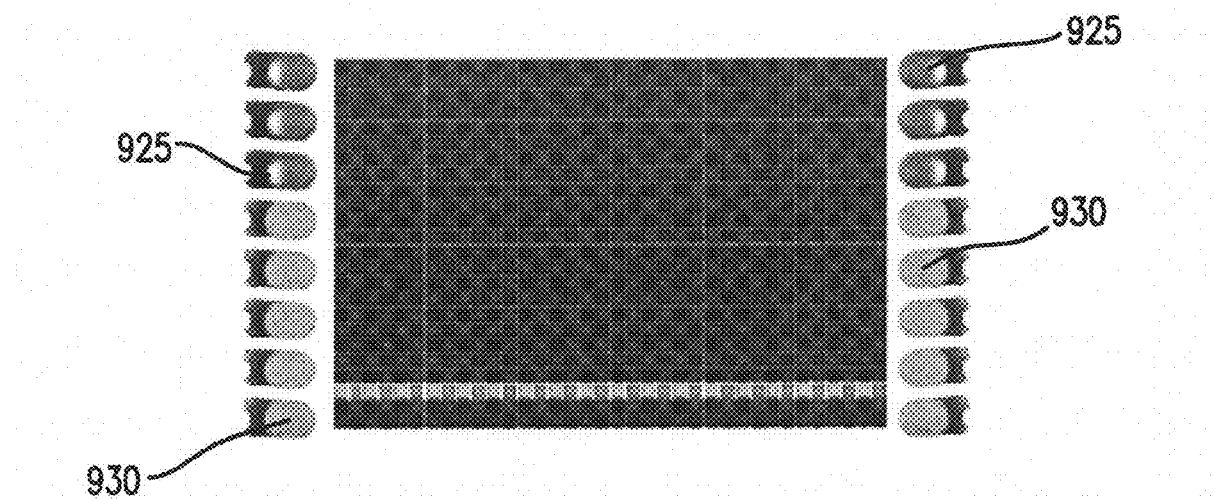

For example, FIG. 9B schematically illustrates the third scan line 920 from the top of a camera active in its raster scan process. Only the LEDs 925 that would not directly reflect into the active scan line are illuminated at this time. LEDs 930 that would create direct reflection are not illuminated. Accordingly, only indirect illumination is provided (i.e. no direct reflection) to the portion of the target observed by the third scan line of the camera. FIG. 9C illustrates the same camera with the raster scan active for the eleventh scan line 925 from the top. Again, the illuminated LEDs 925 have changed to ensure that the target area observed by the eleventh scan line does not have any direct reflections and while providing even illumination. Finally, FIG. 9D illustrates the same camera with the raster scan active for the twenty-second scan line 925 from the top. In this position, the illuminated LEDs 925 are near the top to ensure no direct reflections and even illumination.

Accordingly, by synchronizing fast switching light sources (e.g., LEDs) with the camera's raster scan, substantially reflection-free uniform illumination of the target document is possible. At the same time, the volume of the scanner enclosure can be minimized. It should be noted that the rapid scanning and corresponding illumination of the scanner appear as one continuous exposure to a human observer.

While synchronized illumination does substantially eliminate direct reflection noise caused by scanner internal light sources, this technique does not address external illumination noise (e.g. direct reflection) introduced by the ambient environment. In another exemplary technique of the present invention, the brightness of the scanner's internal lighting is increased to reduce the camera's overall sensitivity to light. Such modification can reduce the camera's susceptibility to less intense ambient lighting that may be present. Furthermore, increased scanner lighting intensity may be combined with other techniques of the present invention, such as those previously discussed, to even further eliminate ambient environment light noise.

Figure 10:
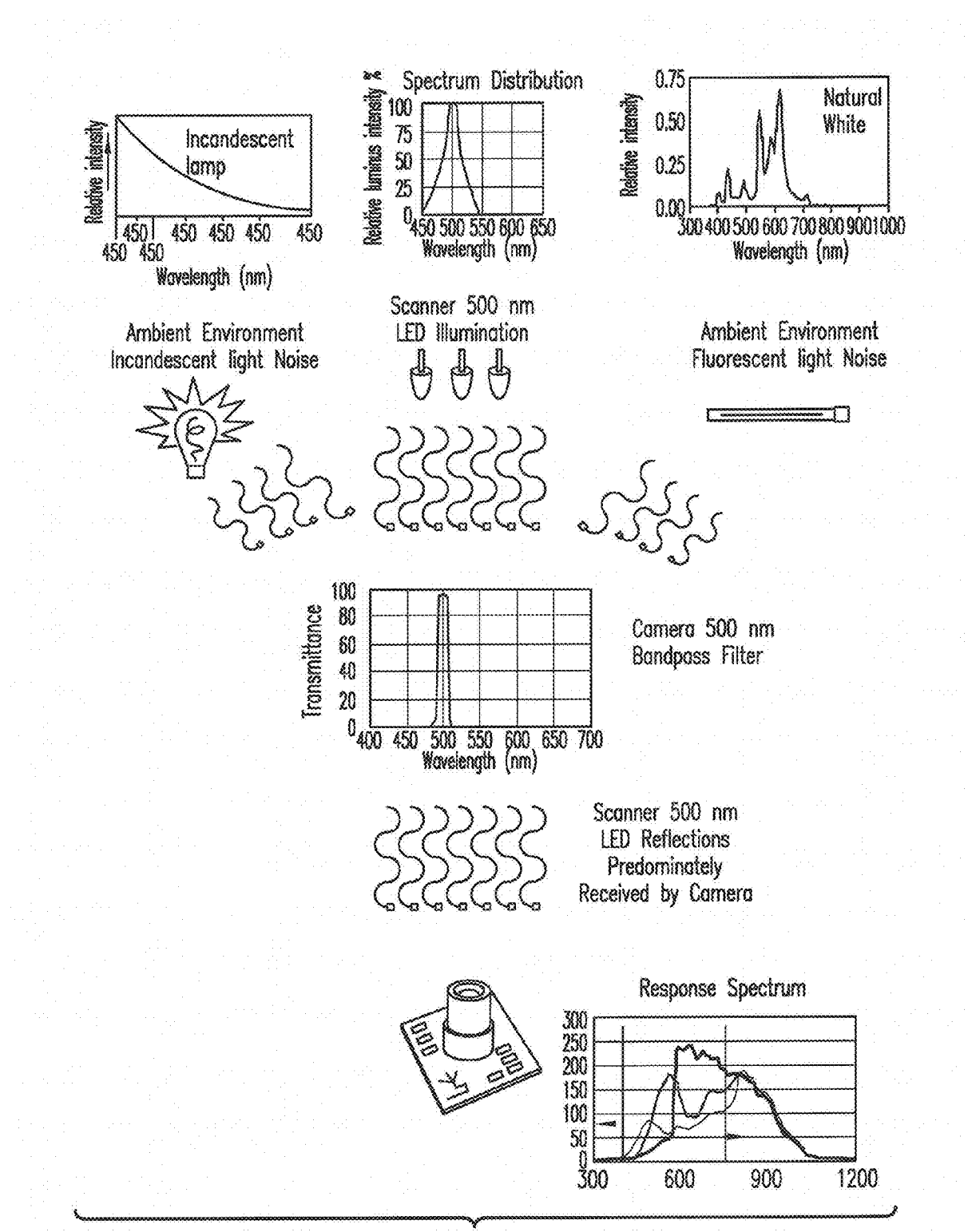

In still another exemplary technique of the present invention, an improved scanner design is provided by including a monochromatic or near monochromatic light source (e.g., LED) that is coupled with a narrow band filter placed in front of the camera as illustrated schematically in FIG. 10. Such exemplary technique can virtually eliminate most sources of ambient light noise.

Alternatively, instead of using a camera-mounted fixed-band filter, in another exemplary embodiment of the present invention, different color light sources (e.g., red, green, blue) are built into the scanner. With this embodiment, when a document is inserted in the scanner for capture, the camera can be programmed to first capture one frame with the scanner's lights extinguished. Therefore, any light readings that are recorded in this frame represent the environment's ambient light noise contribution. The average magnitude of the intensities of all of the camera's red, blue, and green pixels can then be compared. The color with the lowest average reading is selected for illumination and processing, since it represents the lowest light level of the environmental noise. For example, assume the averages of the red, blue, and green pixels from the first (ambient light) frame from the camera revealed that the relative intensities were as follows: red=212, green=87, and blue=132. In this embodiment, the scanner would automatically turn on its green LEDs for illumination and only use the camera's green pixels for processing of the document. Thus, the red, blue, and green pixel filters present on any color camera and the red, blue, and green LEDs built into the scanner would function as a dynamic filter to enhance the signal to noise ratio of the scanner's light source to its environment. It should be noted that these selective spectrum techniques of dynamic signal to noise reduction require a camera having sufficient pixel density to permit decoding the document using only one pixel color type.

In another exemplary embodiment of the present invention, a majority of the noise sources inherent in camera scanning designs is reduced or even eliminated by incorporating two (or more) cameras that have overlapping fields of view of the same platen. If the two cameras' fields of view are arranged such that they are not completely overlapping, this technique also has the added advantage of minimizing the enclosure volume required for the scanning area. For example, FIGS. 11A through 11C illustrate a lottery terminal 1100 with an open scanning access area 1105 in the front. Terminal 1100 utilizes, by way of example, two 1.3 megapixel cameras 1110 and 1115 along with a mirror 1120 to provide a large scan 7.1×5.4 inches (181×136 mm) field of view with 280 dpi resolution. For this exemplary embodiment, the overlap between the two cameras 1110 and 1115 can be processed digitally to either eliminate the overlap area of one of the two cameras or process both camera overlap image areas to achieve a composite image.

By using a small overlap or eliminating one of the overlapping camera images, this embodiment of the present invention provides a larger scanning area with relatively high camera resolution in a small enclosure using inexpensive cameras. In other words, the scan area covered by two relatively low resolution cameras (e.g., 1.3 Megapixel) can be larger, provide greater resolution, and be less expensive than a similar arrangement using a single, more expensive, higher resolution camera. Another advantage of a small overlap with two cameras is that a large scan area can be processed in less time (about half the time) required by a single camera processing the same area (i.e., parallel processing between the two cameras). With the exception of low lighting level situations or when digital preprocessing of the image is employed (discussed below), this advantage may be minimized as improvements in scanner cameras increase.

Alternatively, if two cameras are mounted side-by-side and each view the entire document, the resulting composite image can then be evaluated with digital processing techniques to accomplish one or more of the following: a) substantially or completely eliminate glare (direct reflections) from all sources; b) reduce errors induced by a bent (or bowed) document; c) reduce errors from a platen and camera not being parallel; and d) enable multi-spectral scanning of the same document at the same time. Of course, all of these gains come at the cost of a smaller scanning area with a larger enclosure as discussed above. Each of these corrections is discussed below along with improvements according to exemplary techniques of the present invention.

a) Virtually Eliminate Glare

As previously discussed, glare is a direct reflection of a light source to the camera lens, and glare can make it impossible for the scanner to read portions of a document. However, since glare is a direct reflection of a light source to the camera lens, most sources of glare would not directly reflect into both cameras at the same time—assuming the two cameras are mounted side-by-side as shown in FIGS. 11A through 11C. This mounting arrangement means that, for the most part, glare will appear on different areas of the document from the perspective of the two cameras. Thus, by digitally switching the good image areas from each camera, a composite image can be constructed that is virtually glare-free. Of course, this composite imaging method of glare reduction can be used in conjunction with other methods previously discussed (e.g., three sided enclosure, synchronized lighting, etc.) Alternatively, this composite imaging method can be used to reduce the scanner's dependency on some of these methods—e.g. to allow for a more open scanner enclosure.

b) Reduce Bent Document Errors

Bent document error, as previously discussed, results when the actual and perceived location of imagery on a bent or bowed document do not coincide. If the bent portion of the document is within the field of view of both side-by-side cameras, the resulting parallax shift of the same point on a document from one camera to the other can be used to digitally normalize the point's location on a virtual flat platen. In the context of this provisional application, the term "parallax shift" means measuring the differences in optical distortion as perceived by the two parallel cameras mounted along the same baseline. These differences in optical distortion can then be triangulated between the two cameras allowing a virtual ideal image (i.e., an image without the distortions) to be digitally constructed. This correlation and corresponding correction is particularly advantageous for documents, like bet slips, where the location of a mark on the two-dimensional document conveys information.

Figure 14A:
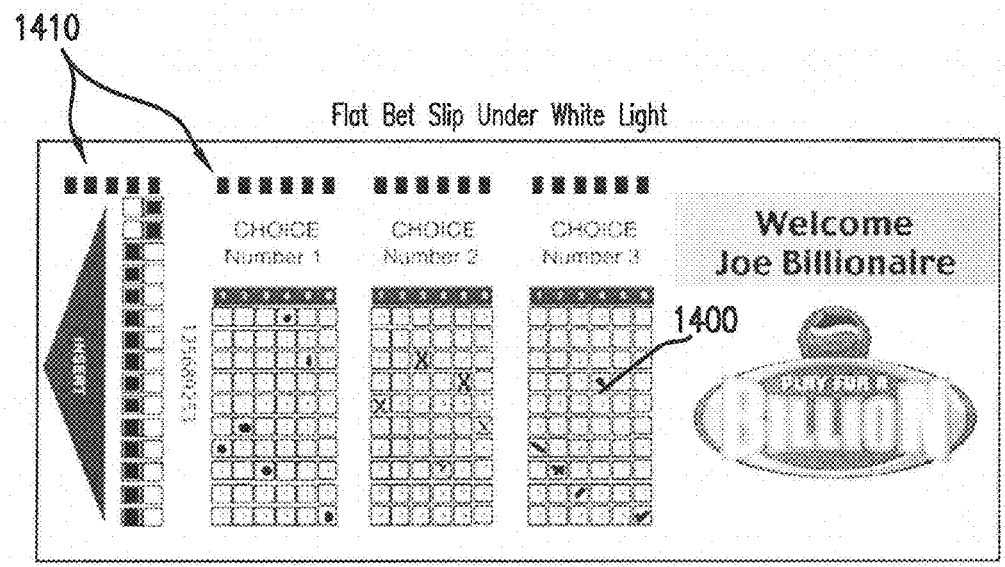
FIGS. 14 and 15 illustrate a bet slip document containing user-entered locational information.
Figure 14B:
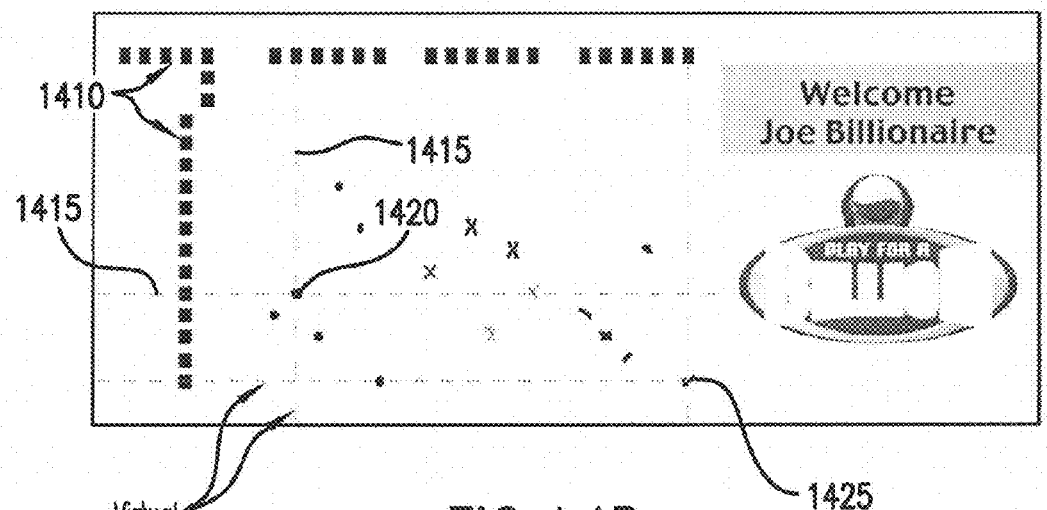
Figure 15:
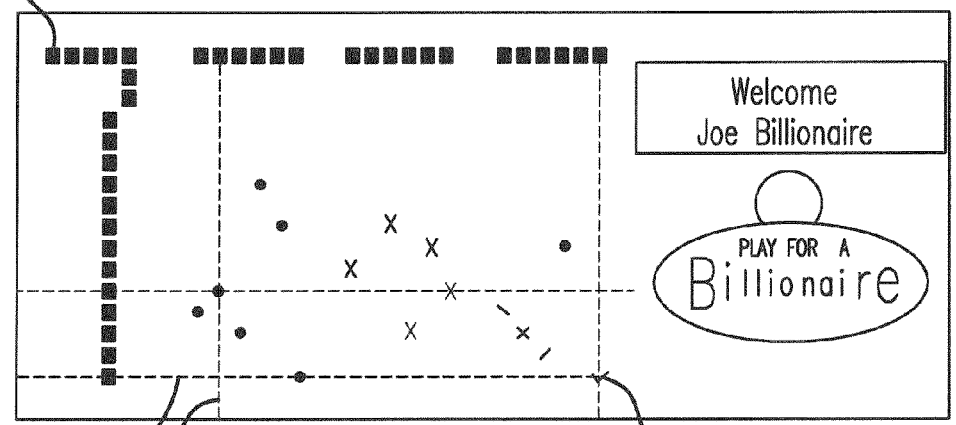

FIGS. 14A and 14B illustrate images of a typical bet slip aligned flat on the platen. The grid locations 1400 that have been filled in with a pen denote the numbers that the player desires for "Choices 1, 2, and 3"—e.g., the player's selection for Choice 1 (1405) is "657029" as shown in FIG. 14A. FIG. 14A illustrates the bet slip as it would appear in normal, white, light. FIG. 14B illustrates how the same bet slip would appear under red light illumination. This type of selective illumination filtering is widely known in the art and is used to eliminate the background for digital processing of only relevant data. Thus, when the color-filtered image is scanned, the terminal's processor only need identify preprinted clock marks 1410 and the marks made by the consumer 1400 to deduce the numbers selected on a virtual grid. For example, FIG. 14B shows virtual grid lines 1415 for the second number 1420 selected by the player in Choice 1 and the sixth number 1425 in Choice 3. This process works well provided the bet slip remains flat and parallel to the camera so that the perpendicular virtual grid overlay accurately maps the surface of the bet slip. However, in the event of a warped bet slip or a non-parallel platen, the perpendicular virtual grid overlay can convey incorrect information as illustrated in FIG. 15.

While edge of ticket mapping or measuring of the distortion of the clock marks can be attempted with a single camera to compensate for warped distortion, it is extremely difficult to deduce all of the nuances of a three-dimensional surface with a single camera perspective. A better way is to map the differences between two cameras' perspectives (i.e., parallax shift) to deduce the amount and type of distortion in a non-flat/non-parallel document. This difference in perspectives can be analyzed and corrected through a wide variety of mathematical tools including principles of mapping, trigonometry, trilateration, etc. Mapping will be discussed herein and it should be understood that one of skill in the art, using the teachings disclosed herein, will be able to apply other mathematical tools to this problem.

Figure 16:
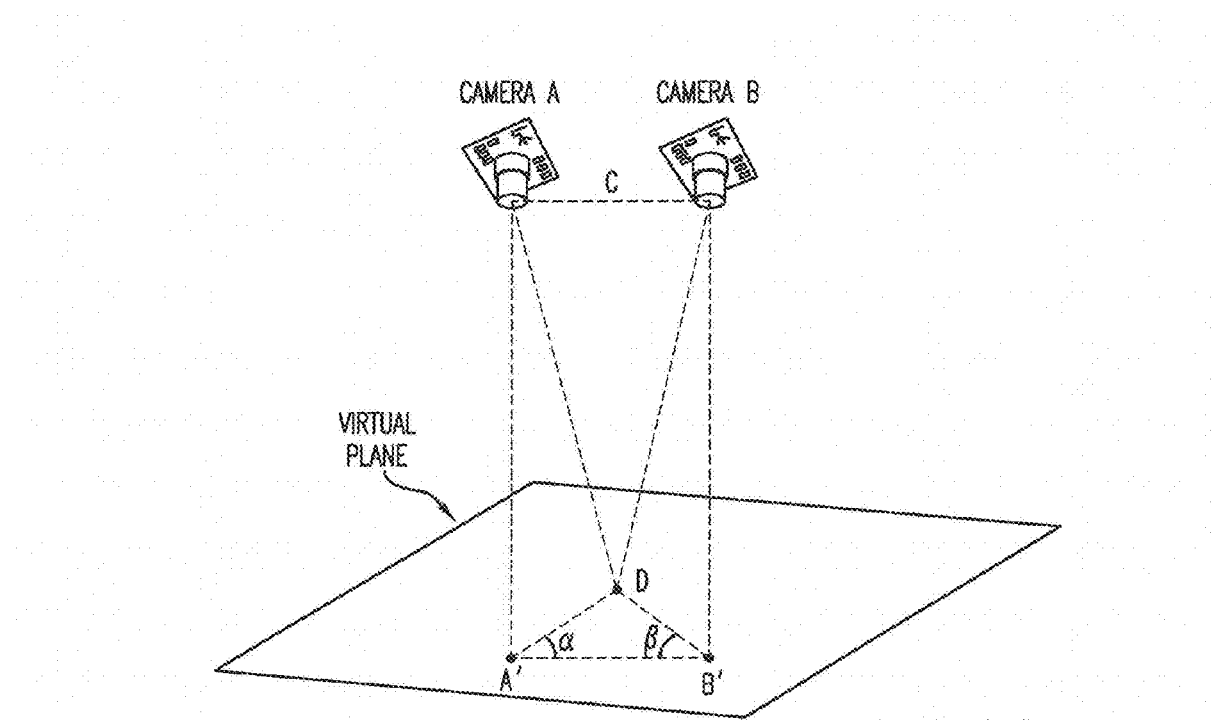
FIGS. 16 through 18 illustrate the differences in perspective for a two camera scanning system.

FIG. 16 illustrates a two-camera scanning system with differing perspectives of a point D on the virtual plane (i.e., perfectly parallel and flat relative to cameras A and B). In this example, points A' and B' represent the points on the virtual plane directly beneath the center pixels of cameras A and B respectively. The line segment C represents the distance between the center of cameras A and B and therefore accounts for the difference in perspective between the two cameras. By simple geometry, it is understood that the line segment C is equal in length to the line segment on the virtual plane formed between points A' and B'. Thus, the differences in the two cameras perspectives can be mapped directly to the virtual plane as different points of origin—i.e., point A' for camera A and point B' for camera B. Notice how these two differing points of origin create different reference coordinates for any arbitrary point D on the virtual plane even if D is selected such that the angle to D from the line segment A' B' on the virtual plane is approximately the same from both points of origin.

Figure 17:
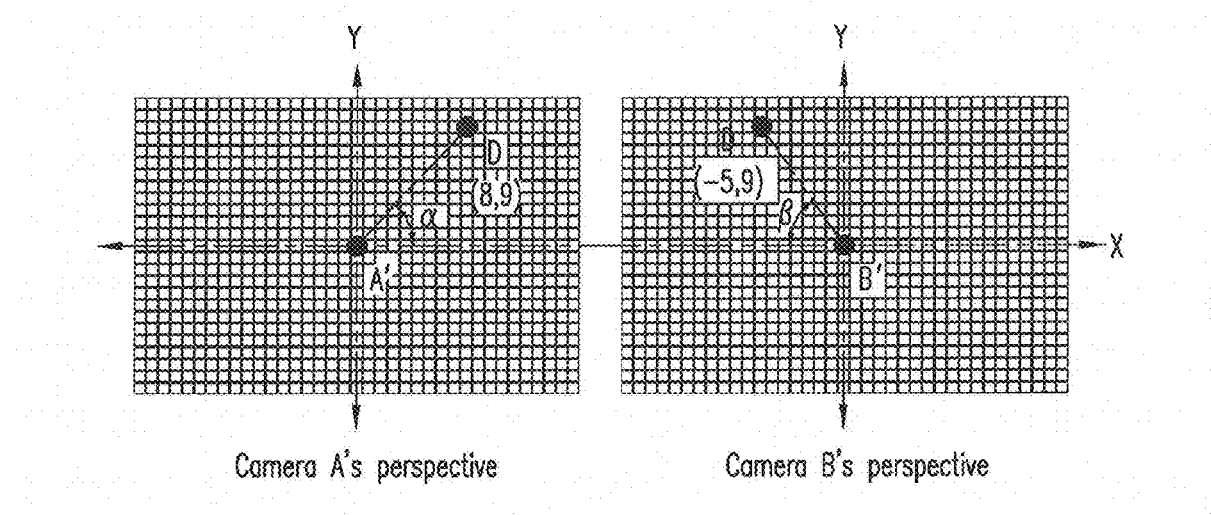

If the concept of points on the virtual plane is equated to pixels in each of the two cameras, where pixel coordinates are assigned for each camera relative to their center pixels (i.e., A' or B'), a one-to-one mapping can be established between the two cameras as set forth in FIG. 16. Thus, any pixel (point) containing a dot of information will have different coordinates on each camera. Since the virtual plane is, by definition, perfectly flat and parallel to the two cameras there exists a mapping function to equate any pixel with information from camera A to camera B and vice versa. For example, referring to FIG. 17, point D as seen from the perspective of camera A has orthogonal grid coordinates 8, 9; but, the same point D has grid coordinates −5,9 from the perspective of camera B.

Figure 18:
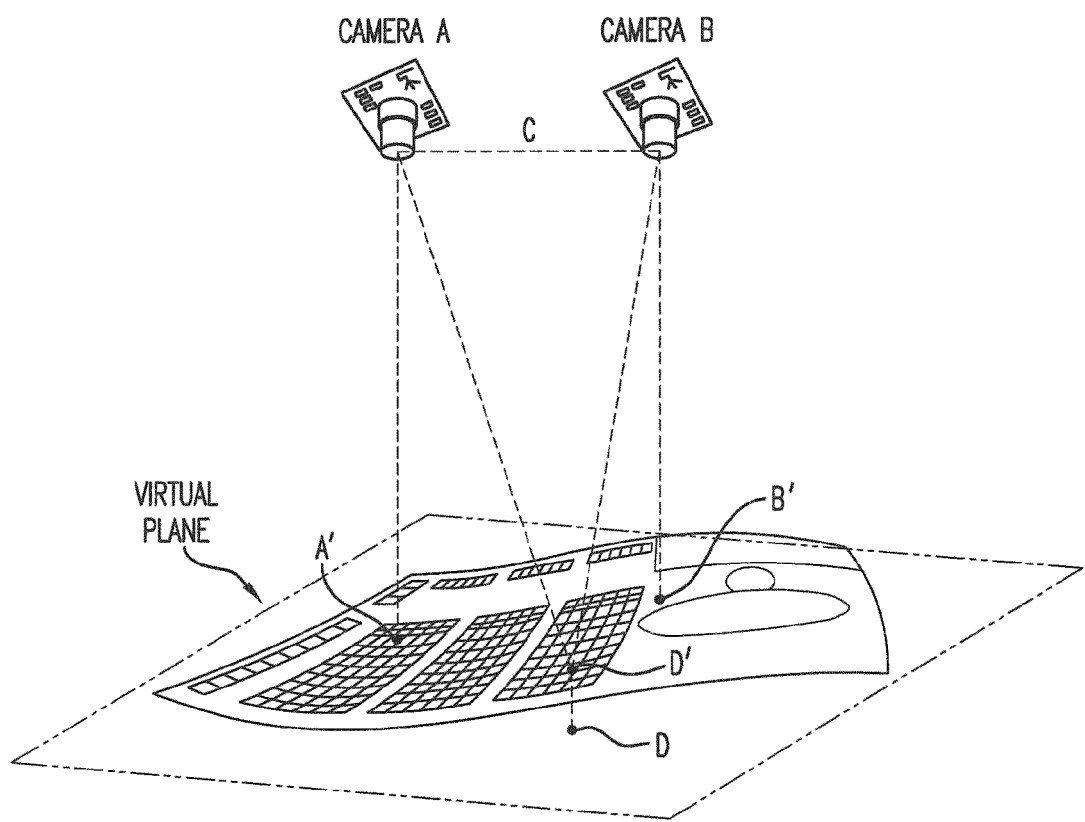

This idealized virtual plane can then be used to normalize a common dot of information that is observed by the two cameras on a warped or non-parallel document. In the previous example, the a priori mapping function between the two cameras would dictate that if a point D was observed by camera A at coordinates 8,9 then the same reference point D should be located at −5,9 on camera B's coordinate system. If the point was found to have different coordinates on camera B then −5,9; the difference would be attributable to either a warped (i.e., not flat) document, or a non-parallel plane, or a combination of the two. In any case, a mapping function (e.g., Transverse Mercator projection) can be used to normalize the dot's location on both coordinate systems A and B to the virtual plane as represented in FIG. 18. Accordingly, under some circumstances, the image error induced by a bent document can be reduced by comparing the images of two side-by-side mounted cameras. Such comparison could be performed automatically by software, for example.

c) Reduce Nonparallel Platen/Camera Noise

Nonparallel platen/camera error can also cause offsets between the perceived and actual position of target document features as previously discussed. Again, the parallax shift between the two side-by-side camera perspectives can be used to digitally correct for the nonparallel platen and camera with the methodologies previously discussed. However, in the case of a nonparallel platen/camera (as opposed to the "bent document" condition) the source of error is the scanner itself. In another exemplary technique of the present invention, a permanent digital correction factor can be automatically computed by scanning a precision array of points printed on a special calibration document.

d) Multi-Spectral Scanning

Figure 12:
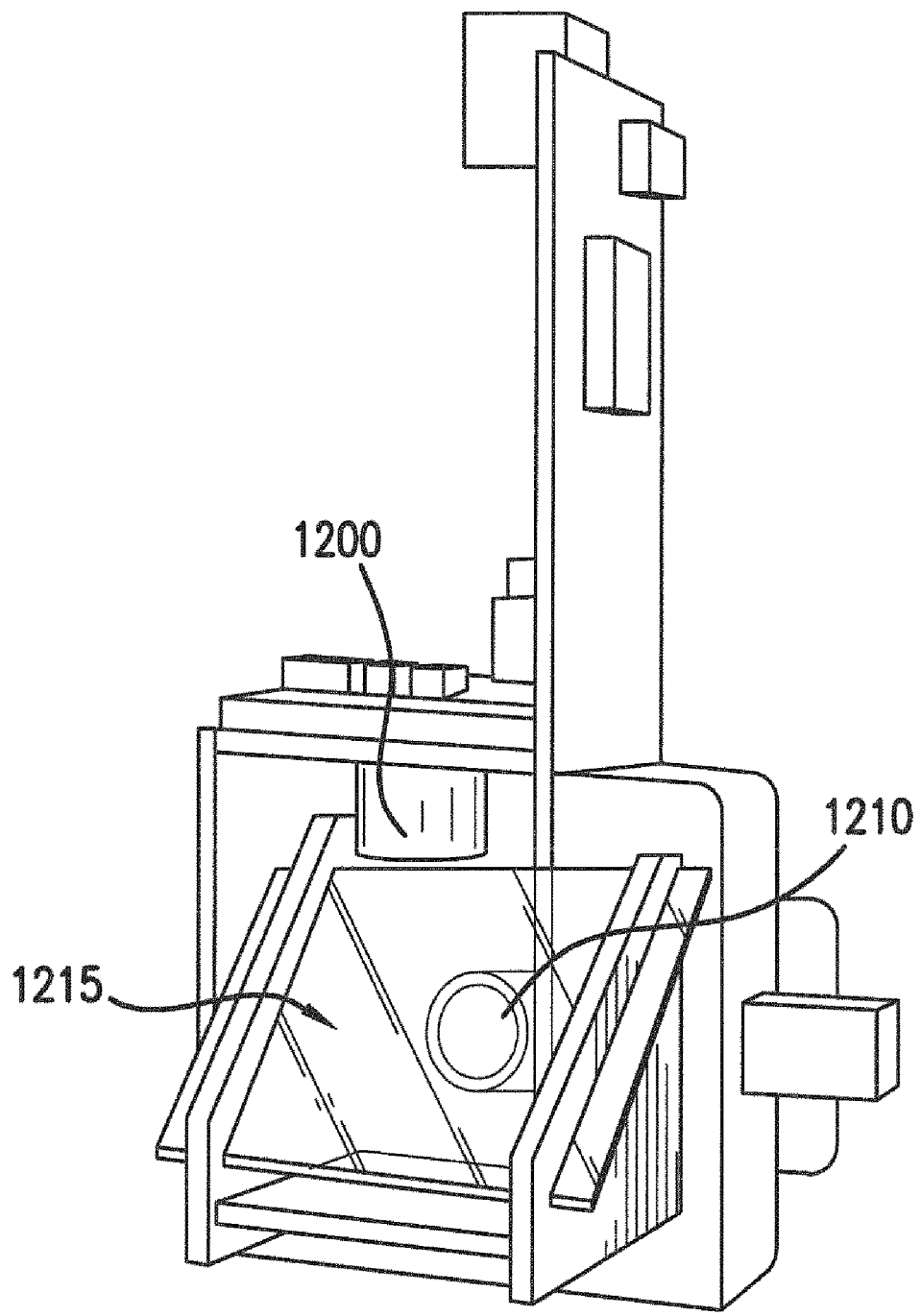

The selective spectrum techniques previously discussed can be incorporated to provide each camera in the embodiments of FIGS. 11A through 11C with a different bandpass filter. For this exemplary aspect of the present invention, two different bands of light may be scanned at the same time. Such an arrangement could be used to help eliminate noise or also to authenticate a document. For example, a document could be viewed both in white light and infrared at the same time with a taggant added to the document that uses white light to trigger fluorescence in the infrared band. It should be noted that the multi-spectral scanning technique does not require two cameras to be side-by-side. More specifically, the cameras could be mounted in the same optical path with a beam splitter sending a portion of the reflected light to each camera as shown in FIG. 12, which depicts two cameras 1200 and 1210 along with a partially silvered mirror 1215. However, this shared optical path/beam splitter design likely will not work for any technique requiring different perspective or parallax shift for normalization.

Some of the techniques for reducing ambient environmental noise may require intelligent processing to accompany the hardware configuration. While it may be possible for the primary processor of the scanner's host terminal to perform this function, host processor loading and communications bandwidth requirements may be greatly reduced by adding a Digital Signal Processor (DSP) to the scanner to perform image filtering and preprocessing. At a base level, according to another exemplary technique of the present invention, a scanner mounted DSP can provide the low level interface to the camera chip(s) and coordinate the raster scan as well as other parameters—e.g., exposure. The DSP's utility can be further enhanced if it is programmed to coordinate light synchronization; selective red, green, blue pixel filtering (previously discussed); or coordination and synchronization of dual cameras—all as previously discussed. Finally, the DSP can further reduce the burden on the primary processor by performing imaging preprocessing, which may include, for example 1) rotating and cropping the scanned image to only provide the primary processor with data from the actual document; 2) detecting overlapping documents—i.e. cropping and only providing image data for the document on the top; 3) compressing the scanned image; 4) transmitting only the information necessary for the task at hand; and/or 5) detecting direct reflections by, for example, detecting saturated pixels in the camera (full scale readings) and passing a warning message to the primary processor to alert the human operator.

While the previously disclosed two-dimensional scanner designs improve the processing and acquisition of image data, yet another exemplary technique of the present invention provides a method for aligning on-line tickets for branding and allowing their digital image to be captured by a scanner. Branding is a concept used in the lottery industry to permanently mark a submitted on-line ticket (receipt) for a completed drawing. Once the submitted ticket is verified as a winner, the branding system prints "PAID" (or words to the same effect) on the ticket's surface, usually by using a thermal print head. Branding can be used for other purposes in the lottery industry, like printing "CANCELED" on tickets printed by mistake. Regardless, in each case the process is substantially the same. Once the ticket is verified (i.e., barcode or other data read from it), a secondary printing process overprints wording or other symbology to indicate a change of status for the ticket.

Figure 13A:
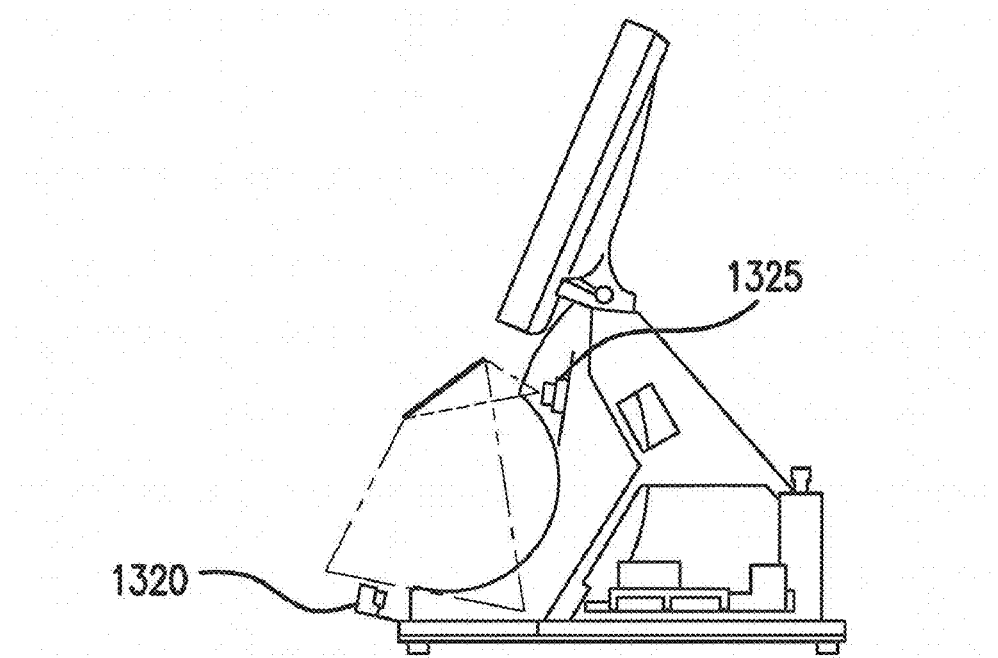
Figure 13B:
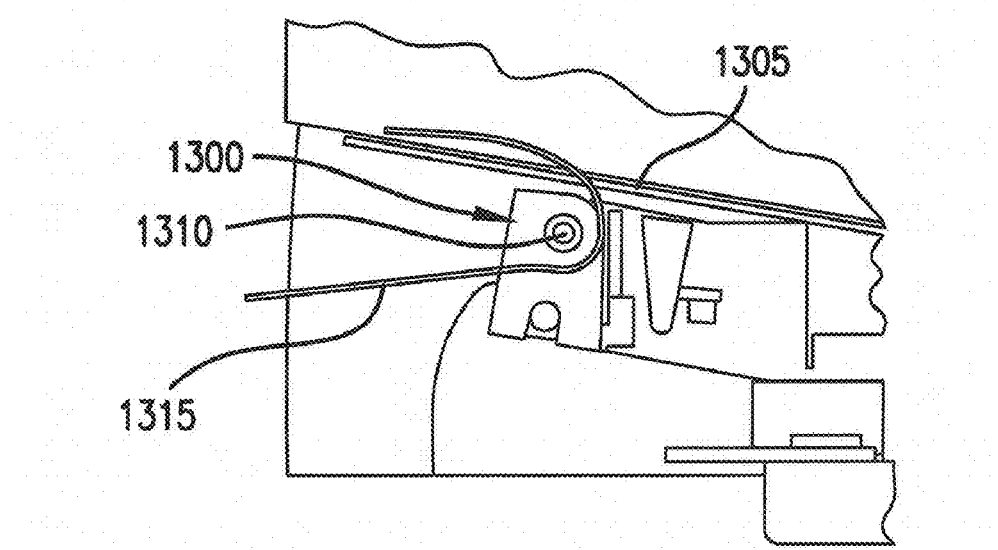
Figure 13C:
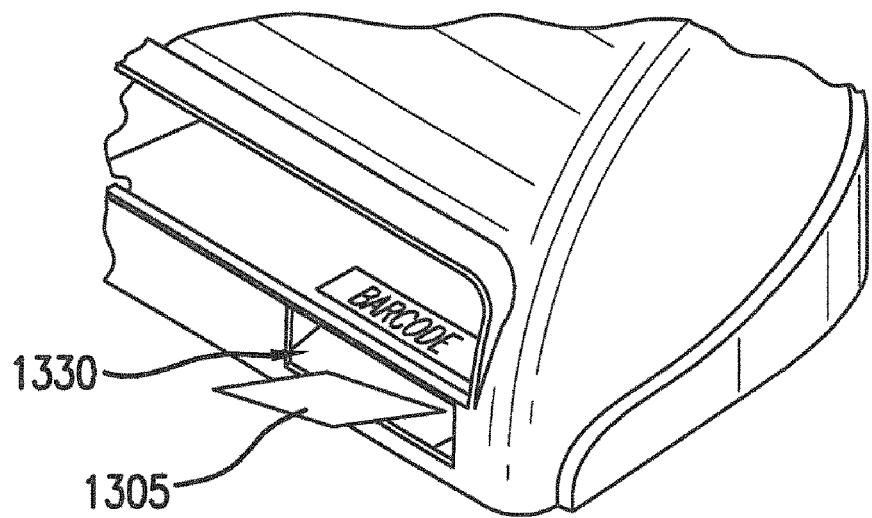
Figure 13D:
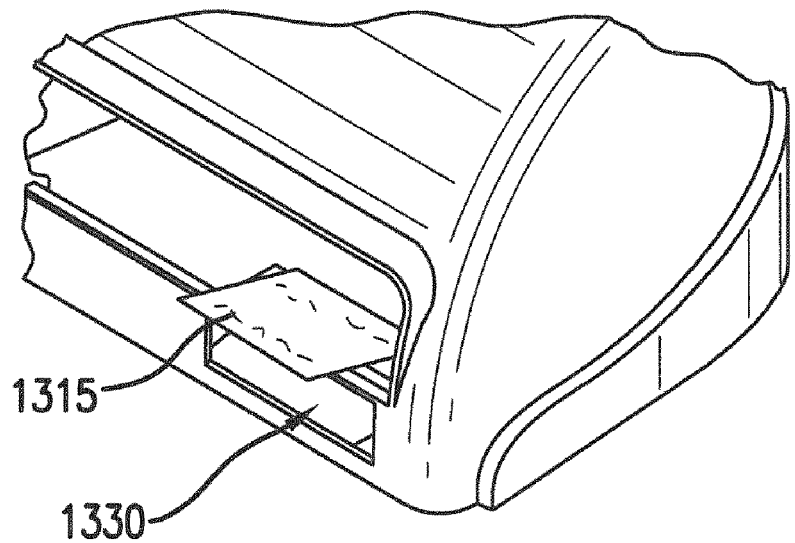

As shown in FIGS. 13A through 13D, a branding mechanism 1300 (e.g. branding thermal print head 1305 and motor 1310 to move ticket 1315) is mounted directly underneath the scanner platen of a terminal 1320. Terminal 1320, for example, uses the same previously described two dimensional scanning system with cameras 1325 to read the ticket's barcode. With this scanning/branding system, the human operator places the submitted ticket 1315, barcode first, into an input slot 1330 below the platen. Motor 1310 advances ticket 1315 so that the ticket 1315 and its barcode emerge onto the platen where it is scanned (FIG. 13D. By mounting the branding mechanism beneath the platen with a separate input slot 1330, the human operator approaches the same area he or she uses for all other transactions. The ticket path is illustrated in FIG. 13B. Assuming the ticket's barcode decodes to valid information, the appropriate branded status is then printed on the part of the ticket 1315 remaining in the mechanism and the ticket 1315 is ejected onto the platen. Conversely, if the barcode decodes to invalid information or cannot be decoded, the mechanism reverses the motor and the ticket 1315 is backed out of the input slot 1330.

Although preferred embodiments of the invention have been disclosed in the foregoing specification, it will be understood by those skilled in the art using the teachings disclosed herein that many modifications and other embodiments are within the scope of the present invention.

What is claimed is:

1. An improved scanning device, comprising:
   an optical element for scanning;
   an enclosure surrounding the optical element on the top, bottom, and along at least three sides so as to shield the optical element from ambient light sources, said enclosure defining an opening for access to the interior of the enclosure, said enclosure having an interior surface comprising a non-reflective finish; and
   a platen positioned within the interior of the enclosure for receipt of a document for scanning, said platen comprising a contact element disposed so as to engage and position the document within a field of view of said optical element for scanning.

2. An improved scanning device as in claim 1, further comprising at least one scanner light positioned within the interior of the enclosure in a manner that minimizes direct-reflections to the optical element.

3. An improved scanning device as in claim 1,
   wherein said platen is tilted within the interior of the enclosure, said platen titled relative to the opening of said enclosure so as to provide for positioning of documents therein to slide against said contact element and to minimize direct reflections from ambient lights sources.

4. An improved scanning device as in claim 1, further comprising:
   a gimbaled mount to which said optical element is attached;
   said gimbaled mount having multiple pivot points configured for allowing the adjustment of the orientation of said optical element relative to said platen.

5. An improved scanning device as in claim 4, further comprising locking elements for fixing the position for said gimbaled mount about the multiple pivot points.

6. An improved scanning device, comprising:
   an optical element for scanning;
   an enclosure surrounding the optical element on the top, bottom, and along at least three sides so as to shield the optical element from ambient light sources, said enclosure defining an opening for access to the interior of the enclosure, said enclosure having an interior surface comprising a non-reflective finish;

wherein said enclosure defines an input slot for receipt of a ticket, and the scanning device further comprises:

a platen positioned within the interior of the enclosure;

a motor positioned below the platen and configured to receive the ticket from the input slot and advance the ticket to said platen; and a printing device positioned proximate to said motor and configured for marking the ticket.

7. An improved scanning device, comprising:

an enclosure defining an opening;

a plurality of optical elements for scanning an item, said optical elements positioned within said enclosure;

at least one light source positioned in said enclosure so as to illuminate the item during scanning, said at least one light source positioned within the interior of said enclosure in a manner that minimizes direct reflections to the two or more optical elements; and a platen positioned within the interior of the enclosure for receipt of the item for scanning, said platen comprising a contact element disposed so as to engage and position the item within a field of view of said optical elements for scanning.

8. An improved scanning device as in claim 7, wherein said platen is tilted within the interior of said enclosure and positioned relative to the opening of said enclosure so as to provide for positioning of items therein against said contact element.

9. An improved scanning device as in claim 7, wherein said platen is positioned relative to the opening of said enclosure so as to minimize direct reflections from ambient light sources.

10. An improved scanning device as in claim 7, further comprising:

a plurality of gimbaled mounts to which said plurality of optical elements is attached;

each said gimbaled mount having multiple pivot points configured for allowing the adjustment of the orientation of a respective optical element relative to said platen.

11. An improved scanning device as in claim 10, further comprising locking elements for fixing the position of each said gimbaled mount about the multiple pivot points.

12. An improved scanning device, comprising:

an enclosure defining an opening;

a plurality of optical elements for scanning an item, said optical elements positioned within said enclosure;

at least one light source positioned in said enclosure so as to illuminate the item during scanning, said at least one light source positioned within the interior of said enclosure in a manner that minimizes direct reflections to the two or more optical elements;

wherein said enclosure defines an input slot for receipt of a ticket and the scanning device further comprises:

a platen positioned within the interior of the enclosure;

a motor positioned below said platen and configured to receive the ticket from the input slot and advance the ticket to said platen; and a printing device positioned proximate to said motor and configured for marking the ticket.

* * * * *